US006639041B2

(12) United States Patent
Nishikawa et al.

(10) Patent No.: US 6,639,041 B2
(45) Date of Patent: Oct. 28, 2003

(54) SPANDEX HAVING LOW SET AT LOW TEMPERATURES

(75) Inventors: Hiroshi Nishikawa, Otsu (JP); Masao Umezawa, Shiga (JP)

(73) Assignee: DuPont-Toray Co. Ltd., Tokyo (JP)

( * ) Notice: Subject to any disclaimer, the term of this patent is extended or adjusted under 35 U.S.C. 154(b) by 0 days.

(21) Appl. No.: 10/148,726

(22) PCT Filed: Dec. 1, 2000

(86) PCT No.: PCT/US00/32854

§ 371 (c)(1),
(2), (4) Date: May 31, 2002

(87) PCT Pub. No.: WO01/40345

PCT Pub. Date: Jun. 7, 2001

(65) Prior Publication Data

US 2002/0193550 A1 Dec. 19, 2002

(30) Foreign Application Priority Data

Dec. 3, 1999 (JP) ............................................ 11-344140
Dec. 3, 1999 (JP) ............................................ 11-344141

(51) Int. Cl.[7] ................................................ C08G 18/10
(52) U.S. Cl. .............................. 528/61; 528/64; 528/65; 528/76; 528/79; 528/906
(58) Field of Search .............................. 528/76, 61, 64, 528/65, 79, 906

(56) References Cited

U.S. PATENT DOCUMENTS

| 3,425,999 A | 2/1969 | Axelrood et al. |
| 4,120,850 A | 10/1978 | Pechhold |
| 4,224,432 A | 9/1980 | Pechhold et al. |
| 4,658,065 A | 4/1987 | Aoshima et al. |
| 5,981,686 A | 11/1999 | Waldbauer, Jr. |

FOREIGN PATENT DOCUMENTS

| EP | 0004356 B1 | 12/1982 |
| EP | 0158229 B1 | 6/1988 |
| JP | 62101622 | 5/1987 |
| JP | 0198624 | 4/1989 |
| JP | 06074952 | 10/1995 |

Primary Examiner—Rachel Gorr

(57) ABSTRACT

A low set (at low temperatures) spandex, based on copoly (alkylene ethers), which are copolymers containing tetramethylene ether and either ethylene ether or 1,2-propylene ether moieties, is provided.

10 Claims, No Drawings

SPANDEX HAVING LOW SET AT LOW TEMPERATURES

BACKGROUND OF THE INVENTION

1. Field of the Invention

This invention relates to spandex comprising a polyurethane based on copoly(alkylene ethers) comprising tetramethylene ether and either ethylene ether or 1,2-propylene ether moieties in certain proportions.

2. Discussion of Background Art

Spandex can be prepared from a variety of polymeric glycols, diisocyanates, and difunctional chain extenders. The polymeric glycols used can be copolyethers, as disclosed in European Patent EP158,229 and EP004,356 and U.S. Pat. Nos. 4,224,432 and 4,658,065. However, spandex made from such copolyether glycols has an unsatisfactory combination of high set at low temperatures when unload power is adequate or low unload power when set is low, and improvements are still needed. Copolyethers are also disclosed in U.S. Pat. No. 3,425,999 and Japanese Patent Applications JP01-098624 and JP62-101622, but their use in making fibers is unknown.

SUMMARY OF THE INVENTION

The spandex of the present invention comprises a polyurethane reaction product of:

(A) a copoly(alkylene ether) glycol selected from the group consisting of poly(tetramethylene-co-ethylene ether) glycols wherein the ethylene ether moiety is present at about 15–37 mole % and poly(tetramethylene-co-1,2-propyleneether) glycols wherein the 1,2-propylene ether moiety is present at about 15–30 mole %, based on total alkylene ether moieties;

(B) a diisocyanate; and (C) a chain extender selected from the group consisting of diamines and diols.

The process of the present invention comprises the steps of:

(A) contacting a copoly(alkylene ether) glycol selected from the group consisting of poly(tetramethylene-co-ethylene ether) glycols wherein the ethylene ether moiety is present at about 15–37 mole % and poly(tetramethylene-co-1,2-propyleneether) glycols wherein the 1,2-propylene ether moiety is present at about 15–30 mole %, based on total alkylene ether moieties with a diisocyanate to form a capped glycol;

(B) dissolving the capped glycol in a solvent;

(C) contacting the solution of the capped glycol formed in step (B) with a chain extender selected from the group consisting of diamines and diols to form a polyurethane spinning solution; and (D) spinning the solution formed in step (C) to form the spandex.

DETAILED DESCRIPTION OF THE INVENTION

It has now been found that spandex comprising polyurethanes derived from certain copoly(alkylene ether) glycols has a surprisingly good combination of high unload power (especially at low extensions) and low set (including at low temperatures, an advantage when fabrics comprising the spandex are used in winter) while retaining high elongation and heat-set efficiency.

As used herein, 'spandex' has its customary definition: a manufactured fiber in which the fiber-forming substance is a long chain synthetic polymer comprised of at least 85% by weight of a segmented polyurethane.

Fabrics are generally worn at relatively low elongations. Therefore, unload power at low fiber elongations (for example 30% and 60%) is important in uses such as tricot knits. When the spandex unload power is too low, the fabric knit from it has little or no sensible recovery power or restraining force. Similarly, low set is important so that after stretching the fabric can return to its intended dimensions without permanent distortion. The spandex of the invention can have an unload power at 30% elongation of at least 0.006 dN/tex, an unload power at 60% elongation of at least 0.012 dN/tex, and a set at −5° C. of not more than about 26%, the unload powers being measured after five 0–200% stretch and relax cycles, and the set being measured after five 0–300% stretch and relax cycles. It has now been found that when the amount of ethylene ether or 1,2-propylene ether moiety in the copoly(alkylene ether) glycol used in making the present spandex is too high, unload power at low elongations is unacceptably low, and set rises. When such ether moiety content is too low, it has little effect, and the set at low temperatures rises.

The copoly(alkylene ether) glycol can be a random copolyether, can be obtained by copolymerization of such a random copolyether with another polymeric glycol, or can be a mixture of such a random copolyether with another polymeric glycol. The copoly(alkylene ether) glycol used in the spandex of the invention can have a number-average molecular weight of about 1300–4500, more typically about 2000–3500.

Diisocyanates useful in making the polyurethane of which the present spandex is comprised include 5-isocyanato-1-(isocyanatomethyl)-1,3,3-trimethylcyclohexane, 1-isocyanato-4-[(4-isocyanatophenyl)methyl]benzene, 1-isocyanato-2-[(4-isocyanato-phenyl)methyl]benzene, 1,1'-methylenebis(4-isocyanatocyclohexane), 4-methyl-1,3-phenylene-diisocyanate, and combinations thereof. 1-isocyanato4-[(4-isocyanato-phenyl)methyl]benzene ("MDI") and mixtures thereof with 1-isocyanato-2-[(4-isocyanato-phenyl)methyl]benzene are preferred because of their ready commercial availability. The mole ratio of the diisocyanate(s) to the copoly(alkylene ether) glycol can be about 1.2–2.3.

Diol chain extenders useful in making the polyurethane used in the spandex of the invention include ethylene glycol, 1,3-propanediol, 1,4-butanediol, 1,2-propylene glycol, 3-methyl-1,5-pentanediol, 2,2-dimethyl-1,3-trimethylenediol, 2,2,4-trimethyl-1,5-pentanediol, 2-methyl-2-ethyl-1,3-propanediol, 1,4-bis(hydroxyethoxy)benzene, bis(hydroxyethylene) terephthalate, and mixtures thereof.

Use can be made of one, or a mixture of two or more, amine catalyst or organic metal catalyst in the preparation of the polyurethane. Illustrative examples of suitable amine catalysts include N,N-dimethylcyclohexylamine, N,N-dimethylbenzylamine, triethylamine, N-methylmorpholine, N-ethylmorpholine, N,N,N',N'-tetramethylethylenediamine, N,N,N',N'-tetramethyl-1,3-propanediamine, N,N,N',N'-tetramethylhexanediamine, bis-2-dimethylaminoethyl ether, N,N,N',N',N'-pentamethyldiethylenetriamine, tetramethylguanidine, triethylenediamine, N,N'-dimethylpiperazine, N-methyl-N'-dimethylaminoethylpiperazine, N-(2-dimethylaminoethyl) morpholine, 1-methylimidazole, 1,2-dimethylimidazole, N,N-dimethylaminoethanol, N,N,N'-trimethylaminoethyl ethanolamine, N-methyl-N'-(2-hydroxyethyl)piperazine, 2,4,6-tris(dimethyl-aminomethyl)phenol, N,N-dimethylaminohexanol and triethanolamine. Suitable examples of organic metal catalysts include tin octanoate, dibutyltin dilaurate and dibutyllead octanoate.

Diamine chain extenders that can be used when a polyurethaneurea is desired as the fiber-forming substance of the spandex include hydrazine, ethylenediamine, 1,2-propanediamine, 1,3-propanediamine, 2-methyl-1,5-pentanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, 1,3-pentanediamine, hexamethylenediamine, 1,3-cyclohexanediamine, bis(4-aminophenyl)phosphine oxide, and mixtures thereof.

To control polyurethane molecular weight and the viscosity of a polyurethane spinning solution, a chain terminator such as n-butanol, diethylamine, cyclohexylamine, or n-hexylamine can be used, generally as a mixture with the chain extender. Small amounts of trifunctional materials such as diethylenetriamine and glycerol can also be used for polymer solution viscosity control.

Either melt polymerization or solution polymerization can be used. In the process of the invention solution polymerization is preferred for less thermal degradation of the polyurethane, especially when a polyurethaneurea is being prepared, since polyurethaneureas are generally too high melting to be prepared by melt polymerization. Useful solution polymerization methods include a "one-shot" method, in which each of the starting materials can be added to the solvent and dissolved and then heated to a suitable temperature and reacted so as to form the polyurethane, and a "prepolymer method". In the prepolymer method, a diisocyanate can be contacted with a copoly(alkylene ether) glycol to form an isocyanate-terminated prepolymer (a "capped" glycol) which can then be dissolved in a solvent suitable for the final polyurethane. Examples of suitable solvents include dimethylacetamide (DMAC), dimethylformamide, dimethyl sulfoxide, and N-methylpyrrolidinone. The dissolved capped glycol can then be reacted with a diol to form a polyurethane or a diamine to form a polyurethaneurea. The prepolymer method is preferred for making polyurethaneureas, which generally dissolve with too much difficulty to be made readily by the one-shot method.

The spandex of the invention can also comprise additives such as UV absorbers, antioxidants, stabilizers against chlorine and gases, delustrants, and the like. Examples include a copolymer of diisopropylaminoethyl methacrylate and n-decyl methacrylate in a 75/25 weight ratio (Methacrol® 2138F, a registered trademark of E.I. du Pont de Nemours and Company), a condensation polymer of p-cresol and divinyl benzene (Methacrol® 2390 D, a registered trademark of E.I. du Pont de Nemours and Company), a polymer of bis(4-isocyanatocyclohexyl)methane and 3-t-butyl-3-aza-1,5-pentanediol (Methacrol® 2462B, a registered trademark of E.I. du Pont de Nemours and Company), poly (diethylaminoethyl methacrylate), hindered phenol-type agents such as 2,4,6-tris(2,6-dimethyl-4-t-butyl-3-hydroxybenzyl)isocyanurate (Cyanox® 1790, from Cytec Industries), 2,6-di-t-butyl-4-methylphenol, and Sumilizer GA-80 (produced by Sumitomo Chemical Co., Ltd.), nitrogen oxide scavengers such as HN-150 (Japan Hydrazine Co., Ltd.), UV stabilizers such as 2,4-di(2',4'-dimethylphenyl)-6-(2"-hydroxy4"-n-octyloxyphenyl)-1,3,5-triazine (Cyasorb 1164D, from Cytec Industries), Sumisorb 300#622 (Sumitomo Chemical Co., Ltd.), benzotriazole-type agents such as various products available under the brand designation Tinuvin®, phosphorus-containing agents such as Sumilizer P-16 (Sumitomo Chemical Co., Ltd.), hindered amine-type agents such as various products available under the Tinuvin® trademark, inorganic pigments such as titanium oxide, zinc oxide and carbon black, barium sulfate, metallic soaps such as magnesium stearate, mixtures of huntite and hydromagnesite (for example at 0.75 wt % based on weight of polyurethane), germicides containing silver, zinc or compounds thereof, deodorants, lubricants such as silicone and mineral oils, and antistatic agents such as cerium oxide, betaine and phosphorus-containing compounds. Any suitable method can be used for incorporating the additives into the polyurethane solution, for example, for uniform incorporation, as a solution or a slurry.

When wet- or dry-spinning are used to make the spandex, the just-spun filaments typically can be brought together, for example in an coalescence jet, to form a coalesced multifilament. The spinning speed can be 300–800 m/min or higher, and the circumferential speed ratio of the godet (feed) roll to that of the winder can be about 1.1–1.8. No particular limitations are imposed on the size or cross-sectional shape of the inventive spandex, which can, for example, have a round or flattened cross-section.

The spandex of the invention can be used alone or in combination with various other fibers in wovens, weft (including flat and circular) knits, warp knits, and personal hygiene apparel such as diapers. The spandex can be bare, covered, or entangled with a companion fiber, for example nylon, polyester, acetate, cotton, and the like.

Unless otherwise noted, physical characteristics of the spandex made in the Examples were measured as follows. An Instron 4502 tensile tester was used to determine tensile properties. Tenacity, elongation, and stress relaxation were measured at 22° C. and, on a different sample, set was measured at –5° C. A 5-cm length ("$L_1$") of fiber was stretched to 300% elongation at a rate of 50 cm/min and allowed to relax. The stretch-and-relax cycle was repeated five times. Immediately after the fifth stretch, the stress at 300% elongation was recorded as "$G_1$". The fiber was held at 300% stretch for 30 seconds, and the resulting stress was recorded as "$G_2$". The fiber was allowed to relax a fifth time, and its length when the stress became zero was recorded as "$L_2$". The fiber was then stretched a sixth time until it broke. The tenacity when the yarn broke was recorded as "$G_3$", and the length of the specimen at the time of break was recorded as "$L_3$". The tenacity-at-break, elongation-at-break, stress relaxation, and set were determined using the following formulas:

| | |
|---|---|
| Tenacity at break (cN/dtex) = | $G_3$ |
| Elongation at break (%) = | $100 \times (L_3 - L_1)/L_1$ |
| Stress Relaxation (%) = | $100 \times (G_1 - G_2)/G_1$ |
| Set (%) = | $100 \times (L_2 - L_1)/L_1$ |

Heat-set efficiency was measured by treating the yarn with 100° C. steam in an unrestrained state for 10 minutes, after which it was treated with 100° C. boiling water in an unrestrained state for 2 hours, then dried for one day at room temperature. Next, the yarn (length=$L_4$) was extended 100% (length=$2 \times L_4$), treated for 1 minute with 115° C. steam at the extended length, after which it was dry heat-treated at 130° C. at the same length, then left to stand one day at room temperature, again at the same length. The yarn was subsequently released from the extended state, and its final, relaxed length ("L$_5$") was measured. The heat-set efficiency was calculated as follows:

$$\text{Heat-set efficiency }(\%)=100\times(L_5-L_4)/L_4$$

In all of the tests, at least three samples were tested and an average was calculated from the results. In the Tables, "n.m." means not measured.

Unless otherwise noted, all Examples, except Example 5, had the following common elements: The mole ratios of ether moieties in the copolyether glycols are believed to be accurate within 15% relative; in Example 5, the mole ratios were accurate to less than about 5% relative. The mole ratio (capping ratio) of diisocyanate to polyether glycol was 1.64. An additive package of 2.2 wt % of a polymer of bis(4-isocyanatocyclohexyl)methane with 3-t-butyl-3-aza-1,5-pentanediol (Methacrol® 2462B) and 0.9 wt % of a condensation polymer of p-cresol and divinyl benzene (Methacrol 2390D) was added to the spinning solution; both weight percents were based on the total weight of the final fiber. Two filaments were dry-spun and coalesced to form a 20-decitex multifilament yarn.

EXAMPLE 1

A random poly(tetramethylene-co-ethyleneether) glycol (about 70/30 mole ratio) having a weight-average molecular weight of 3300 and a number-average molecular weight of 2100 was used. The copolyether glycol was prepared substantially as described in Example 1 of Japanese Published Patent Application JP01-098624. Thus, tetrahydrofuran (811 parts, 11.26 mole) and 1,4-butanediol (25 grams, 0.28 mole) were contacted with ethylene oxide (154.2 grams) in the presence of 6.6 grams of a boron trifluoride/tetrahydrofuran complex and 0.8 gram water to obtain 620 grams of the copolyether glycol with 54% conversion of the tetrahydrofuran. Such a copolyether glycol can be obtained from Sanyo as Tetraxynol®. The copolyether glycol was contacted with 1-isocyanato-4-[(4-isocyanatophenyl)methyl] benzene ("MDI") to form a capped (isocyanate-terminated) glycol which was then dissolved in DMAc, chain-extended with ethylene glycol, and chain-terminated with n-butanol to form a polyurethane spinning solution. The amount of DMAc used was such that the final spinning solution had 40 wt % polyurethane in it, based on total solution weight. The spinning solution was dry-spun into a column provided with 380° C. dry nitrogen at 380° C., coalesced, passed around a godet roll and wound up at 540 m/min. The ratio of the circumferential speeds of the godet roll to the winder was 1.42. Spinnability was good. Fiber properties are presented in Table I.

EXAMPLE 2

A polyurethane was prepared as in Example 1, but a random poly(tetramethylene-co-1,2-propyleneether) glycol (about 70/30 mole ratio), also prepared similarly as described in Example 1, was used. The copolyether glycol had a weight-average molecular weight of 3000 (estimated number-average molecular weight about 1900). The spinning solution was 38 wt % polyurethane, and it was spun as in Example 1. Fiber properties are also given in Table I.

Comparison Example 1

A polyurethane was prepared as in Example 1 but using a random poly(tetramethylene-co-ethyleneether) glycol having a mole ratio of tetramethylene ether to ethylene ether moieties of about 90/10 and a weight-average molecular weight of 3300 (estimated number-average molecular weight of about 2100), also prepared similarly as described in Example 1. The spinning solution was 38 wt % polyurethane, and it was spun as in Example 1. Properties of the resulting spandex are given in Table I.

TABLE I

|  | Example 1 | Example 2 | Comparison Example 1 |
| --- | --- | --- | --- |
| Tenacity at break, cN/dtex | 0.8 | 1.0 | 1.1 |
| Elongation at break, % | 430 | 450 | 424 |
| Stress relaxation, % | 18 | 20 | 25 |
| Heat-set efficiency, % | 77 | 76 | 72 |
| Set at −5° C., % | 21 | n.m. | 31 |

Examination of the data in Table I reveals that the spandex of the invention has desirably lower low-temperature set, lower stress relaxation, and higher heat-set efficiency than spandex outside of the invention. It was unexpected that such related characteristics could be so optimized that the undesirable characteristics diminished while the desirable charateristics improved or were unchanged. In addition, elongation was slightly increased.

EXAMPLE 3

A polyurethaneurea was prepared from poly (tetramethylene-co-ethyleneether) glycol as prepared in Example 1, MDI, ethylenediamine chain extender, and diethylamine terminator. The amount of DMAc used was such that the spinning solution was 38 wt % polyurethaneurea. The solution was readily spun into fiber as in Example 1. Physical properties are presented in Table II.

EXAMPLE 4

Example 3 was repeated except that the poly (tetramethylene-co-1,2-propyleneether) glycol as prepared in Example 2 was used and the spinning solution was 39 wt % polyurethaneurea. Spinning was carried out as in Example 1, and spinnability was good. Physical properties of the fiber are given in Table II.

Comparison Example 2

Comparison Example 1 was repeated except that ethylenediamine was used as the chain extender and the spinning solution was 39 wt % in polyurethaneurea The spinning conditions of Example 1 were used, and the solution spun well. Physical properties are given in Table II.

TABLE II

|  | Example 3 | Example 4 | Comparison Example 2 |
| --- | --- | --- | --- |
| Tenacity at break, cN/dtex | 0.9 | 0.9 | 1.0 |
| Elongation at break, % | 522 | 503 | 515 |
| Stress relaxation, % | 17 | 21 | 22 |
| Heat-set efficiency, % | 43 | 39 | 41 |
| Set at −5o C., % | 19 | n.m. | 28 |

Analysis of the data in Table II reveals that the spandex of the invention, in the aggregate, shows better properties than spandex outside of the invention. Specifically, the spandex of this invention has desirably lower low-temperature set, lower stress relaxation (especially when the glycol is a poly(tetramethylene-co-ethyleneether) glycol), and similar heat-set efficiency and elongation.

EXAMPLE 5

A series of poly(tetramethylene-co-ethylene ether) glycols was prepared. Illustrated here is a glycol of 50 mole % ethylene ether moiety. "Parts" are by weight.

Tetrahydrofuran ("THF"), 79.5 parts, ethylene oxide ("EO"), 20 parts, and water, 0.5 part, were mixed and held in a tank at ambient temperature, fed to a 100-gal (379 liters) continuous stirred tank reactor held at 50° C. under 45–50 psi (310–345 kPa) nitrogen pressure. The reactor contained 50 lbs (23 Kg) Tonsil KO montmorillonite clay catalyst (from Süd Chemie) in approximately 800 lbs (363 Kg) THF. The inlet and outlet rates were 100 lbs (45 Kg) per hour. After the reactor reached equilibrium, the product mixture contained 30–40 wt % THF, 50 wt % THF/EO copolymer, 6–9 wt % oligomeric cyclic ether byproducts ("OCE"), and <1 wt % of dioxane and water. The mixture was filtered to remove catalyst and transferred to an evaporator heated to 120° C. at 400 mm Hg pressure to remove most of the THF. The resulting concentrated product was heated to 95° C. and contacted with Amberlyst A-15 (an acidic ion-exchange resin from Rohm & Haas) under reduced pressure (10–15 mm Hg) to reduce the amount of OCE to about 2–3 wt %. The product copoly(alkylene ether) was then dried at 95° C. and 10–15 mm Hg pressure. The resulting product contained 97–98 wt % poly(tetramethylene-co-ethylene ether), 2–2.7 wt % OCE, and less than 0.05 wt % of THF, water, and dioxane, as determined by gas chromatography. Proton NMR showed that the copolyether was 50 mole % in ethylene ether moiety. The number-average molecular weight was about 1750, calculated from the hydroxyl number, determined by acetic anhydride/pyridine titration.

Other members of a poly(tetramethylene-co-ethylene ether) glycol series were made using the same ingredients, catalyst, and resin, but in a glass 1-liter continous reactor under nitrogen at atmospheric pressure and at 50–70° C.

Polyurethaneureas were prepared by contacting the series of poly(tetramethylene-co-ethyleneether) glycols with MDI, dissolving the resulting capped glycols in DMAc (to become about 25 wt % polymer based on the total weight of the final solution), chain extending with an 80/20 mole ratio mixture of ethylenediamine and 1,3-cyclohexanediamine, and chain terminating with diethylamine. The total isocyanate moiety content of the capped glycols was determined to be 2.65 wt % NCO in each case by the method of S. Siggia, "Quantitative Organic Analysis via Functional Group", 3rd Edition, Wiley & Sons, New York, pp. 559–561 (1963). The molar ratios of diisocyanate to polyether glycol were, therefore, in the range of 1.68–1.85, depending on the molecular weight of the polyether glycol. The slight variation in copolyether glycol molecular weights is believed to have little effect on polyurethaneurea properties. To each solution was added 0.5 wt %, based on final solution weight, of Santowhite® powder [1,1-bis(2-methyl-4-hydroxy-5-t-butylphenyl)-butane, available from Flexsys]. Films of 5-mil (0.013 cm) thickness were cast with a doctor knife on a Mylar® polyester sheet (a registered trademark of E.I. du Pont de Nemours and Company) and allowed to dry overnight in a hood. The films, still on the Mylar® sheet, were conditioned as is at 150° C. for 10 minutes and then in boiling water for 30 minutes. Samples, 4-mil (0.010 cm) wide and 5.1-cm long, were cut from the film-sheet laminates, removed from the Mylar® backing, and subjected to tensile testing with an Instron tester. The samples were stretched to 200% elongation at a rate of 50 cm/min and allowed to relax. The stretch-and-relax cycle was performed five times. Unload power (stress) was measured at two points (30% and 60% elongation, "$UP_{30}$" and "$UP_{60}$", respectively) on the fifth relaxation cycle and was reported in deciNewtons per tex. Percent elongation-at-break was measured on the sixth extension. Set was also measured at 22° C. on samples that had been subjected to five 0–200% elongation/relaxation cycles. The set ("% S") was calculated as a percentage:

$$\% S=100(L_a-L_b)/L_b,$$

wherein $L_b$ and $L_a$ are, respectively, the filament (yarn) length, when held straight without tension, before and after the five elongation/relaxation cycles. Three samples were tested, and an average was calculated from the results. Physical properties of the films are reported in Table III.

TABLE III

| | Mole % Ethyleneether Moiety in Copolyether | | | |
|---|---|---|---|---|
| | 50 | 37 | 31 | 22 |
| Copolyether glycol MW | 1750 | 2080 | 2223 | 2100 |
| Elongation at break, % | 713 | 731 | 725 | 640 |
| Set, % | 15 | 14 | 14 | 13 |
| $UP_{60}$, dN/tex | 0.011 | 0.012 | 0.012 | 0.013 |
| $UP_{30}$, dN/tex | 0.005 | 0.006 | 0.007 | 0.007 |

The standard deviation in unload power values is typically about 0.0002. Above about 37 mole % ethyleneether content in the copolyether glycol, unload power at low elongations is unacceptably low, elongation-at-break declines, and set rises, though very slightly. Below about 15 mole % (extrapolated from the data shown in Table III), there is reduced effect of the ethyleneether moiety on unload power, and the elongation-at-break declines.

EXAMPLE 6

A film of a polyurethaneurea derived from poly (tetramethylene-co-ethyleneether) glycol (about 70/30 mole ratio, number-average molecular weight 2223), MDI (2.65 wt % NCO) and chain extended with hydrazine, prepared using a process similar to that of Example 5, had an elongation-at-break of 739%, a set of 12%, and unload powers at 60% and 30% elongation of 0.014 dN/tex and 0.008 dN/tex, respectively.

EXAMPLE 7

A polyurethaneurea was prepared from the same poly (tetramethylene-co-ethyleneether) glycol as prepared in Example 3, MDI, ethylene diamine chain extender, and diethylamine chain terminator by contacting the polyether glycol with the diisocyanate to make a capped glycol, dissolving the capped glycol in sufficient DMAc so the final spinning solution was 35 wt % polyurethaneurea, and chain extending/terminating the capped glycol. The spinning solution was spun through 8 spinneret holes, coalesced into 4 filaments, and wound up at 650 m/min. The resulting 36 denier (32 dN/tex) spandex, when tensile-tested using five 0–200% stretch-and-relax cycles, had an average (based on three samples) elongation-at-break of 610%, $UP_{60}$ of 0.014 dN/tex, and $UP_{30}$ of 0.007 dN/tex. These data further confirm the unexpectedly good combination of properties of the spandex of this invention and that data obtained on films, especially $UP_{60}$ and $UP_{30}$ values, are adequate predictor of $UP_{60}$ and $UP_{30}$ properties of spandex.

What is claimed is:

1. Spandex comprising a polyurethane reaction product of:
   (A) a copoly(alkylene ether) glycol selected from the group consisting of poly(tetramethylene-co-ethylene ether) glycols wherein the ethylene ether moiety is present at a level of about 15–37 mole % and poly(tetramethylene-co-1,2-propyleneether) glycols wherein the 1,2-propylene ether moiety is present at a level of about 15–30 mole %, based on total alkylene ether moieties;
   (B) a diisocyanate; and
   (C) a chain extender selected from the group consisting of diamines and diols.

2. The spandex of claim 1 wherein the copoly(alkylene ether) glycol is poly(tetramethylene-co-ethylene ether) glycol having a number-average molecular weight of about 1300–4500, the diisocyanate is selected from the group consisting of 1-isocyanato4[(4-isocyanato-phenyl)methyl]benzene and mixtures thereof with 1-isocyanato-2-[(4-isocyanato-phenyl)methyl]benzene, and wherein the molar ratio of diisocyanate to copoly(alkylene ether) glycol is about 1.2 to 2.3, and spandex unload power at 30% elongation is at least 0.006 dN/tex.

3. The spandex of claim 1 wherein the chain extender is selected from the group consisting of hydrazine, ethylenediamine, 1,2-propanediamine, 1,3-propanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, 1,3-cyclohexanediamine, 2-methyl-1,5-pentanediamine, 1,3-pentanediamine, and mixtures thereof, and spandex unload power at 60% elongation is at least 0.012 dN/tex.

4. The spandex of claim 1 wherein the copoly(alkylene ether) glycol is poly(tetramethylene-co-ethylene ether) glycol having a number-average molecular weight of about 2000–3500, the ethylene ether moiety is present at a level of about 20–35 mole %, the molar ratio of diisocyanate to copoly(alkylene ether) glycol is about 1.2–2.3, the chain extender is selected from the group consisting of ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy)benzene, and 1,4-butanediol, and wherein spandex set at −5° C. is not more than about 26%.

5. The spandex of claim 1 wherein the diisocyanate is selected from the group consisting of 1-isocyanato-4-[(4-isocyanato-phenyl)methyl]benzene and mixtures thereof with 1-isocyanato-2-[(4-isocyanato-phenyl)methyl]benzene, the copoly(alkylene ether) glycol is poly(tetramethylene-co-ethylene ether) glycol, the molar ratio of diisocyanate to copoly(alkylene ether) glycol is about 1.2–2.3, the chain extender is selected from the group consisting of hydrazine, ethylenediamine, 1,2-propanediamine, 1,3-propanediamine, 2-methyl-1,5-pentanediamine, 1,3-pentanediamine, 1,3-cyclohexanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, hexamethylene-diamine, and mixtures thereof, and spandex unload power at 30% elongation is at least 0.006 dN/tex.

6. The spandex of claim 1 wherein the diisocyanate is 1-isocyanato-4-[(4-isocyanato-phenyl)methyl]benzene, the copoly(alkylene ether) glycol is a poly(tetramethylene-co-ethylene ether) glycol wherein the ethylene ether moiety is present at a level of about 20–35 mole %, the chain extender is selected from the group consisting of hydrazine, ethylenediamine, 1,2-propanediamine, 2-methyl-1,5-pentanediamine, 1,3-pentanediamine, 1,3-cyclohexanediamine, ethylenediamine, 1,2-propanediamine, 2-methyl-1,5-pentanediamine, 1-amino-3,3,5-trimethyl-5-aminomethylcyclohexane, 1,3-diamino-2,2-dimethylbutane, 2,4-diamino-1-methylcyclohexane, and mixtures thereof, and spandex unload power at 60% elongation is at least 0.012 dN/tex.

7. A process for preparing spandex comprising the steps of:
   (A) contacting a copoly(alkylene ether) glycol selected from the group consisting of poly(tetramethylene-co-ethylene ether) glycols wherein the ethylene ether moiety is present at a level of about 15–37 mole % and poly(tetramethylene-co-1,2-propyleneether) glycols, wherein the 1,2-propylene ether moiety is present at a level of about 15–30 mole %, based on total alkylene ether moieties with a diisocyanate to form a capped glycol;
   (B) dissolving the capped glycol in a solvent;
   (C) contacting the solution of the capped glycol formed in step (B) with a chain extender selected from the group consisting of diamines and diols to form a polyurethane pinning solution; and
   (D) spinning the solution formed in step (C) to form the spandex.

8. The process of claim 7 wherein the copoly(alkylene ether) glycol is poly(tetramethylene-co-ethylene ether) glycol, the diisocyanate is 1-isocyanato4-[(4-isocyanato-phenyl)methyl]benzene, the molar ratio of diisocyanate to copoly(alkylene ether) glycol is about 1.2–2.3, and the chain extender is selected from the group consisting of ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy)benzene, and 1,4-butanediol.

9. The process of claim 7 wherein the copoly(alkylene ether) glycol is poly(tetramethylene-co-ethylene ether) glycol, the diisocyanate is 1-isocyanato-4-[(4-isocyanato-phenyl)methyl]benzene, the molar ratio of diisocyanate to copoly(alkylene ether) glycol is about 1.2–2.3, and the chain extender is selected from the group consisting of hydrazine, ethylenediamine, 1,2-propanediamine, 1,3-propanediamine, 2-methyl-1,5-pentanediamine, 1,3-pentanediamine, 1,3-cyclohexanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, and mixtures thereof.

10. The process of claim 9 wherein the spinning step to form spandex is a dry-spinning step, the poly(tetramethylene-co-ethylene ether) glycol has a number-average molecular weight of about 1300–4500, and spandex unload power at 30% elongation is at least 0.006 dN/tex.

* * * * *